(12) United States Patent
Zhang et al.

(10) Patent No.: US 7,091,506 B2
(45) Date of Patent: Aug. 15, 2006

(54) SEMICONDUCTOR SURFACE-FIELD EMITTER FOR T-RAY GENERATION

(76) Inventors: Xi-Cheng Zhang, 51 Meadows Dr., Melrose, NY (US) 12121-2921; Jingzhou Xu, 115 Orchard Ave., Troy, NY (US) 12180; Kai Liu, 25 13th St., Troy, NY (US) 12180

( * ) Notice: Subject to any disclaimer, the term of this patent is extended or adjusted under 35 U.S.C. 154(b) by 0 days.

(21) Appl. No.: 10/828,654

(22) Filed: Apr. 21, 2004

(65) Prior Publication Data

US 2004/0262544 A1 Dec. 30, 2004

Related U.S. Application Data

(60) Provisional application No. 60/464,176, filed on Apr. 21, 2003.

(51) Int. Cl.
*G01J 5/00* (2006.01)
(52) U.S. Cl. .............................. 250/504 R; 250/493.1
(58) Field of Classification Search ............. 250/504 R
See application file for complete search history.

(56) References Cited

U.S. PATENT DOCUMENTS

| | | | |
|---|---|---|---|
| 5,056,111 A | 10/1991 | Duling, III et al. | |
| 5,420,595 A | 5/1995 | Zhang et al. | |
| 5,543,960 A | 8/1996 | Carrig et al. | |
| 5,623,145 A | 4/1997 | Nuss | |
| 5,680,018 A | 10/1997 | Yamada | |
| 5,710,430 A | 1/1998 | Nuss | |
| 5,729,017 A | 3/1998 | Brener et al. | |
| 5,789,750 A | 8/1998 | Nuss | |
| 5,894,125 A | 4/1999 | Brener et al. | |
| 5,937,118 A * | 8/1999 | Komori | ...................... 385/27 |
| 5,973,864 A | 10/1999 | Lehmann et al. | |
| 6,031,243 A | 2/2000 | Taylor | |
| 6,075,640 A | 6/2000 | Nelson | |
| 6,144,679 A | 11/2000 | Herman et al. | |
| 6,320,191 B1 | 11/2001 | Rudd | |
| 6,479,822 B1 | 11/2002 | Nelson et al. | |
| 6,605,808 B1 | 8/2003 | Mickan et al. | |
| 6,690,023 B1 | 2/2004 | Silivra | |
| 2003/0189235 A1 | 10/2003 | Watanabe et al. | |
| 2004/0238760 A1 * | 12/2004 | Linfield et al. | .......... 250/493.1 |

* cited by examiner

*Primary Examiner*—Nikita Wells
*Assistant Examiner*—Phillip A. Johnston
(74) *Attorney, Agent, or Firm*—RatnerPrestia (57) ABSTRACT

An apparatus and a method for the generation of high-energy terahertz radiation. The apparatus and method function by impinging optical radiation on the surface of a semiconductor substrate, creating a photo-generated dipole emitting terahertz radiation. Because it is desirable to orient the dipole perpendicular to the radiation direction to maximize the power of the terahertz radiation, the surface of the semiconductor is modified to achieve this desirable result. More specifically, three embodiments of the surface modification are disclosed: (1) a grating is created in the top surface of a GaAs semiconductor substrate, (2) an InAs film is formed on a Teflon base to create a grating structure on the semiconductor substrate, and (3) a grating is disposed in the surface of the semiconductor substrate such that the optical radiation engages the substrate at Brewster's angle.

6 Claims, 4 Drawing Sheets

SEMICONDUCTOR SURFACE-FIELD EMITTER FOR T-RAY GENERATION

RELATED APPLICATION

This application claims the benefit of priority to U.S. Provisional Patent Application Ser. No. 60/464,176, filed on Apr. 21, 2003, the contents of which are incorporated in this application by reference.

The U.S. Government has a paid-up license in this invention and the right in limited circumstances to require the patent owner to license others on reasonable terms as provided for by the terms of Contract No. ECS-9905881 awarded by the National Science Foundation (NSF).

FIELD OF THE INVENTION

The present invention relates generally to the generation of terahertz radiation and, more particularly, to the generation of terahertz radiation by impinging a laser on the surface of a semiconductor substrate.

BACKGROUND OF THE INVENTION

Terahertz (T-ray or THz) radiation lies in the far-infrared (FIR) region of the electromagnetic spectrum. More specifically, the terahertz band of the electromagnetic spectrum exists between the mid-infrared band and the microwave band. Loosely defined, the terahertz band encompasses that part of the frequency spectrum that includes the frequencies ranging from about 0.3–10.0 THz or, equivalently, the wavelengths ranging from about 1.0 to 0.03 millimeters.

THz radiation has some unique features. For example, THz waves easily penetrate most non-metallic objects like paper, cardboard, plastics, and moderate thickness of many dielectrics, yet are absorbed by polar materials and liquids. Carriers in semiconductors show strong dielectric response in the terahertz region of the spectrum; metals are substantially opaque to THz radiation. Polar gases such as water vapor, ammonia, hydrogen chloride, and the like have strong and very characteristic absorption lines in the terahertz region. Consequently, the THz spectral range is becoming increasingly important for applications such as remote sensing of gases, quality control of plastic and composite materials, and moisture analysis. In addition, the terahertz frequency range has been of considerable interest in spectroscopy. For example, the electronic properties of semiconductors and metals are greatly influenced by bound states (e.g., excitons and Cooper pairs) whose energies are resonant with THz photons.

More recently, significant applications in optical imaging have become practical. THz radiation imaging shows promise in a variety of analytical imaging applications, such as chemical mapping, and a host of commercial applications such as safe package inspection, industrial quality and process control, food inspection, biology, and medicine. Promising applications also include contamination measurements, chemical analysis, wafer characterization, remote sensing, and environmental sensing.

Within the next decade, x-ray imaging systems will be replaced by imaging systems using terahertz frequency sources and detectors in areas such as medical, security, and quality control applications. T-rays can penetrate most solid substance like x-rays. In contrast to x-rays, however, T-rays are non-ionizing and, therefore, are non-lethal and safer for imaging applications. Further, T-ray systems produce true high resolution images rather than shadowy images produced by x-ray systems.

A heavy demand for terahertz technology also exists in the communications industry. The anticipated development of components necessary for a terahertz frequency heterodyne receiver will result in a dramatic increase in the available bandwidth in wavelength-division-multiplexed communications networks. In summary, there is a growing appreciation for the many potential commercial applications in which terahertz spectroscopy and imaging might be exploited.

Despite its potential, the use of THz electromagnetic signals for such applications as spectroscopy and imaging has been hindered by a lack of suitable tools—including generators for the THz radiation. For example, swept-frequency synthesizers for millimeter— and submillimeter-waves are limited to below roughly 100 GHz, with higher frequencies previously available only through the use of discrete frequency sources. Fourier transform infrared spectroscopy (FTIR), on the other hand, remains hampered by the lack of brightness of incoherent sources. In addition, FTIR methods are not useful if the real and imaginary part of response functions must be measured at each frequency. Finally, real-time imaging using the THz range of the electromagnetic spectrum has not been possible so far due to the poor sensitivity of detectors in this frequency range.

Focusing on generators for THz radiation, although advances in these devices have been significant, generators still operate with a low conversion efficiency. Such inefficiency limits the dynamic range, signal-to-noise, and detectability of the terahertz beams. Continued advances in the technology of terahertz generators requires the conversion process to have improved efficiency. Moreover, THz rays have relatively low average power which renders such radiation unsuitable for some applications.

Various patents define the field of THz radiation generation. For the purpose of providing additional background into this field, a sample of such patents has been collected. Five of the patents are summarized below.

1. U.S. Pat. No. 5,937,118

The '118 patent issued to Komori is directed to a quantum synthesizer, a THz electromagnetic wave generation device, an optical modulation device, and an electron wave modulation device. The electromagnetic wave generation device includes an ultrashort light pulse for a phase-locked multi-wavelength light (reference number 2 in the figures of the '118 patent) that is made incident on a coded excitation light generation portion 3. The phases and amplitudes of the incident light are controlled responsive to frequencies to obtain coded excitation light. The coded excitation light is imputed into a quantum synthesizer 10 having a quantum synthesis portion 1. By this procedure, a THz electromagnetic wave 4 having an arbitrary frequency is generated.

Also included in the disclosed device are quantum wires 19. FIGS. 15A and 15B of the '118 patent illustrate a method of fabricating a quantum wire structure. FIG. 15A shows a single-layer structure; FIG. 15B, a multi-layer structure. First, V-grooves 28 are formed in a semiconductor substrate 21, and then quantum well layers 29 and barrier layers 30 are alternately grown in the V-grooves 28 to form multi-coupled quantum wires. More specifically, V-grooves 28 are formed in a gallium arsenide (GaAs) substrate 21, and a GaAs buffer layer and an AlGaAs buffer layer are formed on the substrate. Further, "n" number each of GaAs quantum wire (quantum well) layers 29 and AlGaAs barrier layers 30 are alternately grown. Thus, there is produced a multi-coupled quantum wire structure comprising the n number of very fine quantum wires 5 nm thick and 30 nm wide (effective width 15 nm) and barrier layers 2 nm thick formed at the bottom of the V-groove 28.

FIG. 20A of the '118 patent shows an example of the band structure of a quantum synthesizer (an excited electron wave synthesis portion corresponding to the numeral 1 of FIG. 6) for exciting the quantum synthesis portion of the invention by optical excitation to generate a THz electromagnetic wave. Ultrashort pulsed light (femtosecond light) with phases and amplitudes controlled for the respective frequencies is formed at an excitation light coding portion (corresponding to the numeral 3 in FIG. 6). Such ultrashort pulsed light is obtained by a commercially available laser, e.g., a Ti-sapphire laser.

2. U.S. Pat. No. 5,729,017

The '017 patent issued to Brener et al. is directed to terahertz generators and detectors. The disclosed system includes a semiconductor substrate 11 that has strip electrodes 12 and 13 interconnected with a DC bias 14. The dipole members 15 and 16 form an electrode gap 17 which is the active site of the device. A laser spot 18 from the pump laser is incident on a portion or all of the gap. The pump source is typically a femtosecond pulse laser operating at a wavelength of 500 nm to 2,000 nm and a pulse duration of 10 picoseconds or less. The generated THz signal radiates in all directions, but a large fraction is emitted into the substrate 11 and is collected from the back side of substrate 11. The disclosed invention focuses on the gap geometry, as defined by various shapes (see FIGS. 2–5 of the '017 patent) given to the dipole members.

3. U.S. Pat. No. 6,479,822

The '822 patent issued to Nelson et al. is directed to a system and method for making spectroscopic and metrology measurements of a sample using terahertz frequency electromagnetic radiation. The disclosed system includes an optical light source 20 and a non-centrosymmetric crystal 30. The optical light source 20 directs a pair of excitation beams 22 to spatially overlap and interfere with one another to form a grating pattern in the non-centrosymmetric crystal 30. The coherent bandwidth of the excitation beams 22 is sufficient to excite a polariton 32 in crystal 30 corresponding to the wave vector of the grating pattern. Polariton 32 propagates to the edge of crystal 30 where its electromagnetic component then couples into sample 50 as electromagnetic terahertz radiation 52. The properties of the sample 50 can alter the characteristics of the terahertz radiation 52 which, following its interaction with sample 50, couples into a second non-centrosymmetric crystal 60 as another polariton 62. Light source 20 directs a temporally delayed probe beam 27 to interact with polariton 62 and produce a signal beam 66, whose intensity is measured by a detector 70. A computer 80 is coupled to the detector 70 and light source 20 to analyze the signal measured by the detector with respect to the properties of the excitation beams 22 and the probe beam 27.

4. U.S. Pat. No. 6,605,808

The '808 patent issued to Mickan et al. is directed to a diagnostic apparatus using terahertz radiation. The disclosed system includes a stainless steel enclosure 1 that contains a generator and a detector for terahertz radiation. The generator comprises a femtosecond laser 2 producing laser radiation 3 within the range of 800–900 nm and in pulse widths of less than 100 fs, and a zinc telluride terahertz generating crystal 4. Under the influence of the laser radiation, the crystal 4 produces terahertz radiation 5. The laser 2 is outside the enclosure 1 and its radiation is directed through a laser window 6. The generator directs terahertz radiation onto a target 12. Reflected terahertz radiation is returned through a reflection receiving window into the enclosure 1 and to the detector 13. A modified atmosphere is provided within the enclosure to permit ready transmission of the terahertz radiation.

5. U.S. Pat. No. 6,075,640

The '640 patent issued to Nelson is directed to signal processing by optically manipulating polaritons. The disclosed system includes a signal source 14 that further includes a waveguide 22 that delivers a high bandwidth terahertz electromagnetic radiation 26 to signal processing material 12 as an input signal. The terahertz radiation can be generated by any of a number of ways known in the art. For example, terahertz radiation can be produced using ultrafast optical signals from a femtosecond laser to modulate electromagnetic radiation emitted from gallium arsenide (GaAs) quantum well structures.

To overcome the shortcomings of conventional generators of THz radiation, a new THz radiation emitter is provided. An object of the present invention is to provide an improved THz emitter having an efficient dipole geometry and minimal Fresnel reflection. A related object is to modify the surface structure of a semiconductor as the THz emitter. Another object is to maximize the power of the THz radiation emitted. Still another object is to improve the conversion efficiency of the THz radiation emitter.

SUMMARY OF THE INVENTION

To achieve these and other objects, and in view of its purposes, the present invention provides an apparatus for the generation of high-energy terahertz radiation. The apparatus includes a laser effective to produce optical radiation and a semiconductor substrate having a refractive index, n, and a photo-generated dipole generated upon interaction with the optical radiation of the laser. The photo-generated dipole is oriented to radiate terahertz radiation having power at least about $n^2$ times higher than the power of the terahertz radiation radiated by a photo-generated dipole which is not so oriented.

The present invention also provides a method for the generation of high-energy terahertz radiation. The method includes the following steps. A semiconductor substrate is provided having a refractive index, n, and a modified surface. An electric field is applied to the semiconductor substrate. Optical radiation is directed to the semiconductor substrate, thereby creating a photo-generated dipole emitting terahertz radiation. The photo-generated dipole is oriented by the modified surface of the semiconductor substrate to emit terahertz radiation having power at least about $n^2$ times higher than the power of the terahertz radiation radiated by a photo-generated dipole which is not so oriented.

The subject invention functions by impinging optical radiation on the surface of a semiconductor substrate, prompting the generation of terahertz radiation. The invention recognizes that it is desirable to orient the dipole perpendicular to the radiation direction to maximize the power of the terahertz radiation. This desirable result is achieved, according to the broad concept of the subject invention, by modifying the surface of the semiconductor. More specifically, three embodiments of the surface modification are disclosed: (1) a grating is created in the top surface of a GaAs semiconductor substrate, (2) an InAs film is formed on a Teflon base to create a grating structure on the semiconductor, and (3) a grating is disposed in the surface of the semiconductor substrate such that the optical radiation engages the substrate at Brewster's angle.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Recent advances in terahertz radiation generation can be attributed to optoelectronic interactions in semiconductor photoconductors. The advantage of this mechanism is that pulsed radiation produced by the interactions can be radiated into free space. It is also broadband and coherent. The beam can be steered using conventional optics to direct it onto samples for analysis, and refracted or reflected to a photodetector operating on the same principle as the generator. Alternatively, in a communications application, the beam could be modulated, transmitted, and received by an electroptic photodetector receiver.

Generally, when a surface state exists in semiconductors, the energy band near the surface is in a bent state, which forms a depletion layer to cause surface electric fields. When laser pulses on the order of femtoseconds are applied to the surface of the semiconductor forming the surface electric fields, electrons and holes induced by the laser beam are accelerated by the electric fields on the surface of the semiconductor, by which a surge current flows to generate THz electromagnetic waves by dipole radiation. The electric field component of the electromagnetic waves is proportional to the time differential of the surge current and proportional to the quadratic time differential of the polarization ratio on the surface of the semiconductor.

In semiconductor materials such as InP or GaAs having a wide band gap, the induced surface electric fields are large and, further, THz pulse waves created by instant photocurrents due to the electric field near the surface are also radiated simultaneously. On the other hand, in InSb or InAs having a narrow band gap, induced surface electric fields are not large and a surface current flows due to the difference of the diffusion rate between electrons and holes formed upon excitation of the surface by optical pulses. This effect creates THz pulse waves; therefore, radiation of THz pulse waves due to the acceleration of instant photo carriers also occurs.

The conventional terahertz generator is relatively simple in structure. Basically, the generator includes a semiconductor substrate with an electric field applied, which could be a surface field or a biased field. The electric field produces a high field photoconductor region at the surface of the semiconductor. When this region is excited by fast pulses of light, very rapid changes in conductivity occur. In the presence of the electric field, these changes in conductivity result in ultrafast pulses of electric current through the dipole and equally ultrafast bursts of electromagnetic radiation are emitted. Much of this radiation is emitted into the substrate and, because it has a photon energy well below the direct bandgap of the semiconductor, the radiation can be collected by suitable lens arrangements on the obverse side of the semiconductor. The radiated beam can be collimated and focused using suitable mirrors, and can be detected by a device operating in a reverse mode to that just described.

The subject invention is directed to an optimal design of a semiconductor surface-field emitter for T-ray generation. In summary, the T-ray semiconductor emitter modifies the orientation of the photo-generated dipole on the surface of semiconductors. Under the same optical excitation conditions, these new structures radiate THz power at least $n^2$ times higher than THz semiconductor emitters without these structures, where n is the refractive index of the semiconductor.

The semiconductor surface field can be used to generate T-rays with femtosecond laser pulses. Basically, the injection of femtosecond light on semiconductors, such as GaAs, generates photo-carriers within the optical absorption length. Driven by the surface field of semiconductors, these carriers (electrons and holes) are separated and form transient dipoles along the surface field direction. The transient dipoles (or surge current) radiate THz radiation and, at far field, the waveform of the radiation is proportional to the first time derivative of the surge current. The bandwidth of the T-ray covers from about 0.1 THz to about 3 THz. No complicated beam alignment is required.

Experimental demonstration and theoretical analysis show that the best incident angle should be the Brewster angle. Presented immediately below is an introductory summary of the general principles of modern optics relevant to the present invention and, more specifically, to the Brewster angle. The summary is intended to provide context for a complete understanding of the invention.

When light travels from a first medium to a more optically dense second medium, the light is refracted toward the normal. Light approaching a rarefied medium from a dense medium is refracted away from the normal. There exists an angle, called the critical angle, $\Theta_c$, such that for all angles of incidence greater than this angle, all of the light is reflected and none is transmitted. This effect is called total internal reflection (TIR) and occurs inside a material that is optically more dense than the material outside the boundary.

Figure 5:
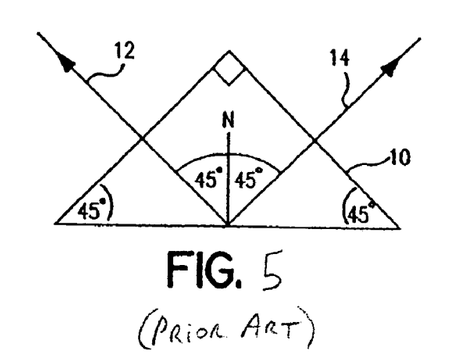
FIG. 5 illustrates total internal reflection in a prism.

A prism is one type of refractive and reflective device. As shown in FIG. 5, a prism 10 is a wedge of optical material that can either refract or totally reflect light, depending on the angle of incidence. The 45° glass prism shown in FIG. 5 is especially useful because incident light 12 entering normal to one face will totally reflect out the other face, having changed direction by 90°. Total reflection occurs because the light strikes the inner surface at 45°, which is greater than the critical angle of about 41° for glass. The line "N" represents a line normal (perpendicular) to a surface.

Figure 6:
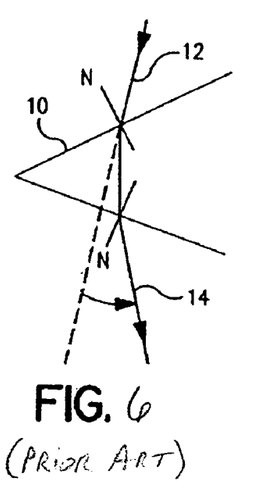
FIG. 6 illustrates deviation of light as it passes through a prism.

Light energy striking an outer surface of the prism 10 at an angle, shown in FIG. 6, is refracted in part, reflected in part by any internal surface, and refracted again as it emerges as exiting light 14. It has deviated from its original direction to emerge at a new angle. The general result is that the light is bent partly back in the direction from which it came. The deviation depends on the index of refraction of the prism, the angle of incidence, and on the angle in the vertex of the prism.

Like all electromagnetic radiation, light is predicted by electromagnetic theory to be a transverse wave: the directions of the vibrating electric and magnetic vectors are at right angles to the direction of propagation (instead of parallel to it, as in a longitudinal wave). The transverse wave also has the characteristic that the vibrations of the electric vector are parallel to each other for all points in the wave (i.e., the wave is oriented, or polarized). In reality, incoherent (non-laser) light propagated in a given direction can consist of short, independent wavetrains whose planes of vibration are randomly oriented about the direction of propagation. Such light, although transverse, is unpolarized. Light can be partially or completely polarized by reflection.

Figure 7:
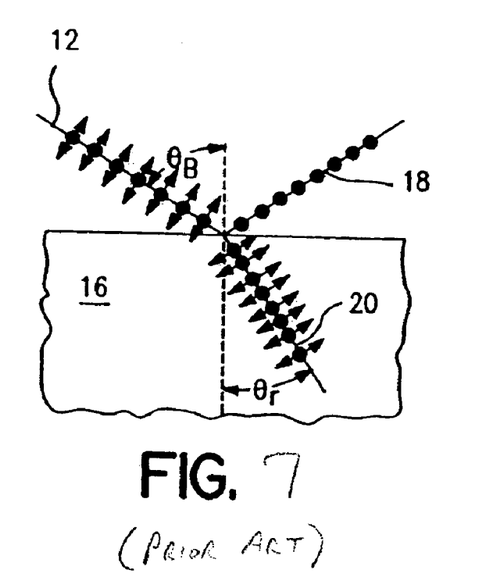
FIG. 7 illustrates an unpolarized light beam incident upon a glass surface.

FIG. 7 shows unpolarized incident light 12 traveling in air and falling on a glass surface 16. The glass has an index of refraction, n, of 1.5. The electric vector for each wavetrain in the light can be resolved into two components. One component is perpendicular to the plane of incidence, which is the plane of FIG. 7, and the other lies in the plane of incidence. The first component, represented by the dots, is the S-polarization component (from the German "senkrecht," meaning perpendicular). The second component, represented by the arrows, is the P-polarization component (for parallel). On average, for completely unpolarized light, these two components are of equal amplitude.

For glass or other dielectric materials, there is a particular angle of incidence, called the polarizing angle (also called Brewster's angle, $\Theta_B$, because it was found experimentally by David Brewster), at which the reflection coefficient for the P-polarization component is zero. Thus, the light 18 reflected from the glass, although of low intensity, is plane-polarized, with its plane of vibration at right angles to the plane of incidence. The P-polarization component at the polarizing angle is entirely refracted at the angle of refraction $\Theta_r$; the S-polarization component is only partially refracted. Thus, the transmitted light 20, which is of high intensity, is only partially polarized.

One limitation on the maximum power of THz radiation achieved, by using the method of fixing the incident angle of the laser on the semiconductor surface as the Brewster angle, is the radiation pattern of a dipole. From basic theory, a dipole does not radiate along its dipole axis. In order to generate forward T-ray radiation, one needs a component of the dipole perpendicular to the THz beam propagating direction. Therefore, the incident angle of the optical beam cannot be of normal incidence. Often, the Brewster angle or a 45° incident angle is used.

The applicants have recognized two limitations. First, even at the Brewster angle, the orientation of the dipole is not the optimal geometry. THz generation is inefficient because of the small angle between the dipole and the direction of the THz wave propagation, which is limited by the refractive index, n, of the semiconductor. A perfect orientation or optimal geometry is to have the entire dipole substantially perpendicular to the T-ray propagating direction. Second, other methods are developing techniques, such as an external magnetic field, which can rotate the orientation of the dipole so that the THz radiation direction will be in a forward or reflection direction. The magnetic field cannot fully rotate the dipole, however, to the desired orientation. As a result, only a small percentage of the field radiates outward, due to the angle of the dipole radiation pattern and total internal reflection.

To enhance the THz radiation, a modified surface structure of the semiconductor as the THz emitter has been developed. The ideal emitter should have the best dipole geometry and less Fresnel reflection. Three specific alternative design embodiments are outlined below with reference to the drawing, in which like reference numbers refer to like elements throughout the various figures that comprise the drawing.

GaAs Grating

Figure 1A:
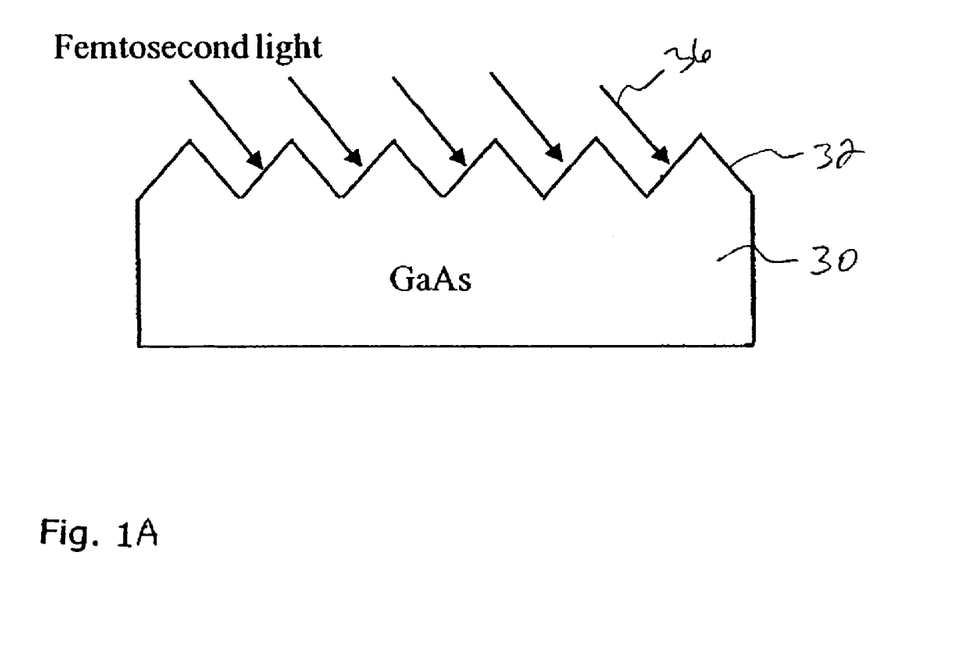
FIG. 1A shows the top surface of a GaAs semiconductor constructed specifically so that a grating is formed according to the present invention.
Figure 1B:
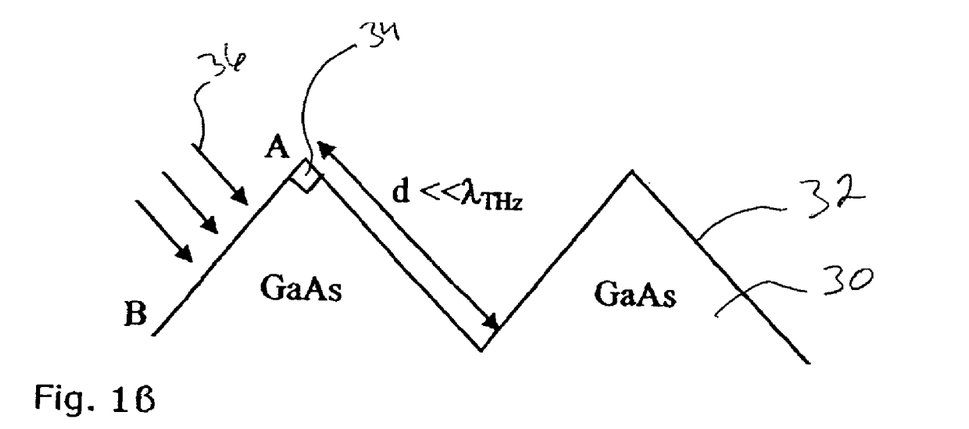
FIG. 1B highlights the grating shown in FIG. 1A.

FIG. 1A shows the top surface of a GaAs semiconductor 30 constructed specifically so that a grating 32 is formed. As shown in FIG. 1B, which highlights the grating 32, the apex angle 34 of the grating 32 is about 90 degrees. The size of the grating 32 is about 1 μm, or up to about 5 μm. Femtosecond light is incident on the grating 32, which forms the surface of semiconductor 30, perpendicular or normal to the surface: in the direction of arrows 36 in FIGS. 1A and 1B. Although other wavelengths are suitable, in a particular example the light has a wavelength (λ) of about 800 nm.

The distance "d" is defined as the length between points A and B of the grating 32. For $d \ll \lambda_{THz}$, the phase offset between points A and B (as shown in FIG. 1B) can be neglected because $$\exp\left(i\frac{2\pi}{\lambda} \cdot d\right) \approx 1.$$

Also, the size of the grating 32 should be larger than the penetration depth of the 800 nm of light. In this case, the generated dipole is perpendicular to another surface and radiates T-rays from the surface. The radiated T-ray is perpendicular to the optical incident angle.

PTFE+InAs Grating

Figure 2:
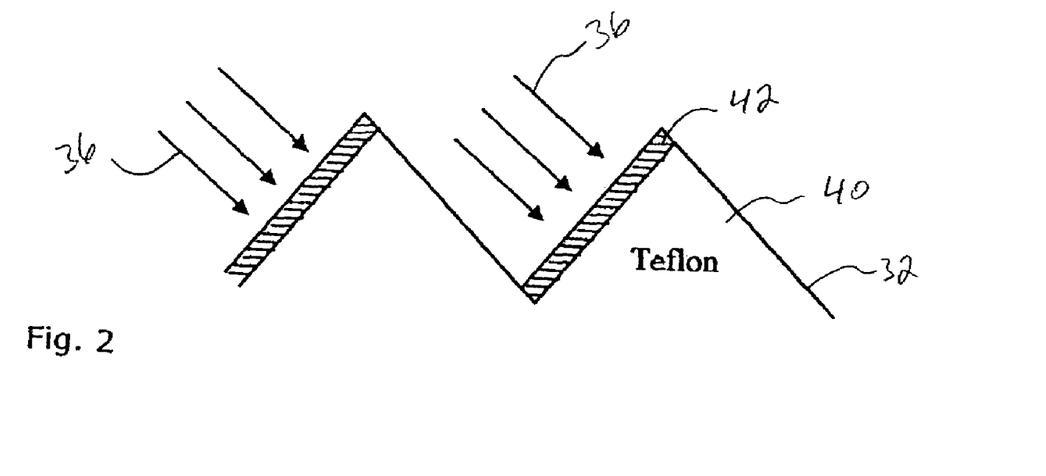
FIG. 2 illustrates a grating structure on a semiconductor incorporating polytetrafluoroethylene and an InAs film according to the present invention.

Another method to enhance THz radiation is to build a grating 32 on the semiconductor 30 using a base 40 of polytetrafluoroethylene or PTFE such as Teflon (a trademark of E.I. duPont de Nemours & Co., Inc. of Wilmington, Del.). An InAs film 42 is grown on top of the surface of the PTFE base 40. The resulting structure is shown in FIG. 2. The thickness of the InAs film 42 should be more than 150 nm to several hundreds of nanometers, due to the short penetration depth of 800 nm light in InAs. In other words, the thickness of the InAs film 42 should be greater than the light absorbance length.

Figure 3:
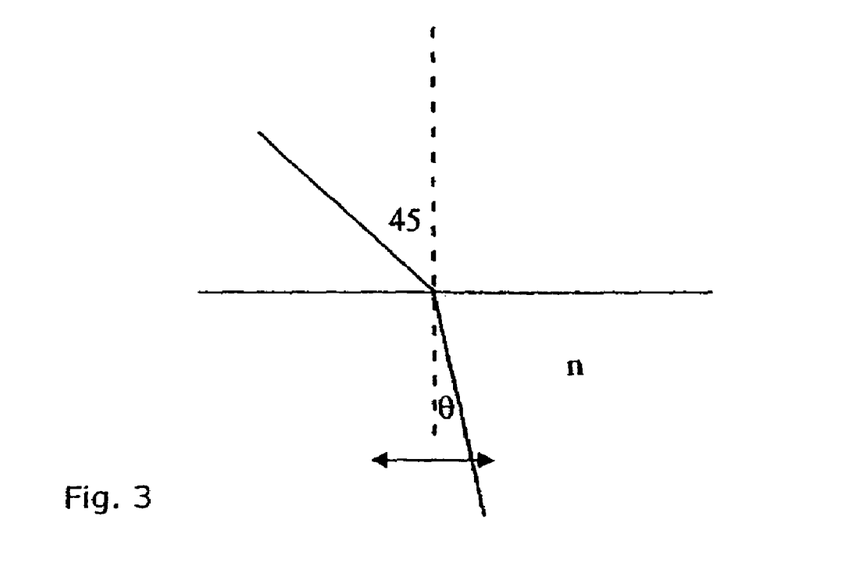
FIG. 3 illustrates the geometry used to calculate the THz enhancement efficiency of the structure depicted in FIG. 2.

A simple calculation of the THz enhancement efficiency of the structure follows. From the geometry illustrated in FIG. 3, the following equation holds true:

$n \sin \theta = \sin 45°.$

The generated dipole is P. Therefore, the outward dipole is then $P \sin \theta = P/\sqrt{2n}$. With the new structure, the outward dipole is P, so the enhancement of THz radiation from the structure will be $\sqrt{2n}$ and the enhancement of the power of THz radiation from the structure is then $2n^2$.

Brewster Angle Grating

Figure 4A:
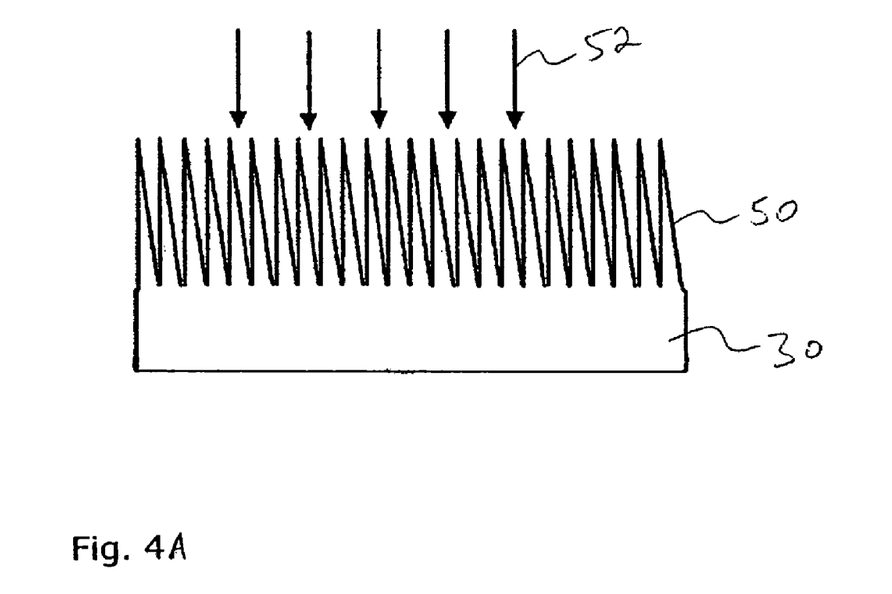
FIG. 4A illustrates a grating, on a semiconductor, formed by a series of structures each having the configuration of a right triangle according to the present invention.
Figure 4B:
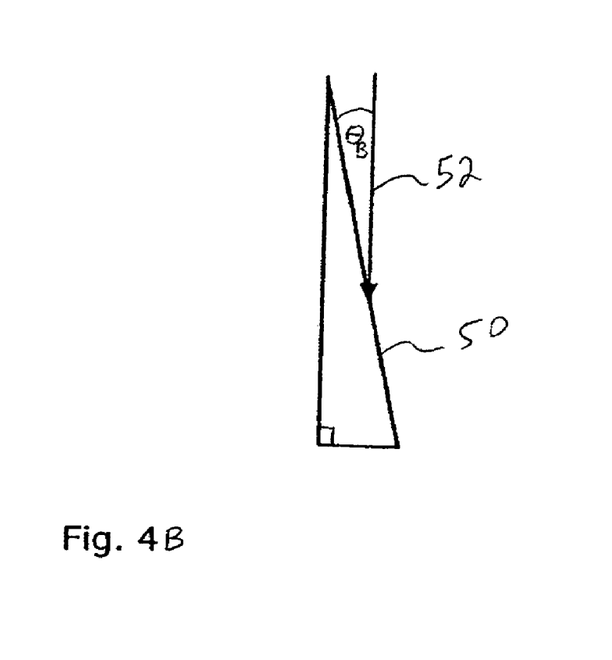
FIG. 4B highlights one of the individual structures that form the grating illustrated in FIG. 4A.

To maximize the utilization of injected femtosecond pulses, incident on the semiconductor surface in the direction of arrows 52, another grating 50 is illustrated in FIG. 4A. The grating 50 is formed by a series of structures each having the configuration of a right triangle—as illustrated in FIG. 4B. The femtosecond light is injected with normal incidence onto the substrate surface with a Brewster angle ($\Theta_B$) to every individual structure of the grating 50. The size of the structure should be on the order of microns.

With this structure, the enhancement of the THz radiation will be $$\frac{1}{\sin\theta} - \frac{n}{\sin\theta_B} \approx n,$$

if the refractive index of the semiconductor is quite large. The enhancement of the power of THz radiation from this type of structure will then be on the order of $n^2$.

Although the invention is illustrated and described above with reference to specific embodiments, the invention is not intended to be limited to the details shown. Rather, various modifications may be made in the details within the scope and range of equivalents of the claims and without departing from the invention. Recent studies of the subject devices have established, for example, that the pulse laser pump can be replaced with two continuous wave (CW) laser signals that are wavelength tuned very slightly apart so that when mixed in the active region of the semiconductor-photoconductor they produce a mixing signal also in the THz range.

What is claimed:

1. An apparatus for the generation of high-energy terahertz radiation comprising:
   a source effective to produce optical radiation; and
   a semiconductor substrate having a refractive index, n, and a photo-generated dipole generated upon interaction with the optical radiation, the photo-generated dipole oriented to radiate terahertz radiation having power at least about $n^2$ times higher than the power of the terahertz radiation radiated by a photo-generated dipole which is not so oriented; and
   a structure of a polytetrafluoroethylene base with an InAs film forming a grating on the surface of the semiconductor substrate.

2. The apparatus of claim 1 wherein the grating has an apex angle of about ninety degrees.

3. The apparatus of claim 1 wherein the InAs film has a thickness greater than the absorbance length of the optical radiation.

4. The apparatus of claim 1 wherein the optical radiation is incident substantially perpendicular to the grating of the semiconductor substrate.

5. The apparatus of claim 1 wherein the grating includes a series of structures each having the configuration of a triangle.

6. The apparatus of claim 5 wherein the optical radiation is incident on the surface of the semiconductor substrate at the Brewster's angle to each individual structure of the grating.

* * * * *

UNITED STATES PATENT AND TRADEMARK OFFICE
CERTIFICATE OF CORRECTION

PATENT NO. : 7,091,506 B2 Page 1 of 1
APPLICATION NO. : 10/828654
DATED : August 15, 2006
INVENTOR(S) : Zhang et al.

It is certified that error appears in the above-identified patent and that said Letters Patent is hereby corrected as shown below:

On Title page of patent:

Item [73] Assignee: Insert --Rensselaer Polytechnic Institute, Troy, New York--

Signed and Sealed this

Twentieth Day of November, 2007

JON W. DUDAS
*Director of the United States Patent and Trademark Office*